(12) United States Patent
Altmann

(10) Patent No.: US 6,626,535 B2
(45) Date of Patent: Sep. 30, 2003

(54) LENS-EYE MODEL AND METHOD FOR PREDICTING IN-VIVO LENS PERFORMANCE

(75) Inventor: Griffith E. Altmann, Webster, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 212 days.

(21) Appl. No.: 09/751,243

(22) Filed: Dec. 29, 2000

(65) Prior Publication Data

US 2002/0085172 A1 Jul. 4, 2002

(51) Int. Cl.$^7$ .............................. G02C 7/02; G02C 7/04; A61B 3/00; G01N 21/41
(52) U.S. Cl. ................... 351/177; 351/159; 351/160 R; 351/246; 623/6.11; 356/128
(58) Field of Search ................. 351/160 R, 160 H, 351/161, 162, 177, 246, 159; 623/6.11; 356/128

(56) References Cited

U.S. PATENT DOCUMENTS

| | | | |
|---|---|---|---|
| 4,955,904 A | | 9/1990 | Atebara ........................ 623/6 |
| 5,984,475 A | * | 11/1999 | Galiana et al. ............. 351/209 |
| 6,030,343 A | | 2/2000 | Chechersky et al. ........ 600/399 |
| 6,485,142 B1 | * | 11/2002 | Sheehy et al. .............. 351/203 |

FOREIGN PATENT DOCUMENTS

| | | | |
|---|---|---|---|
| SU | 1090386 A | 5/1984 | |
| WO | 00/28368 | 5/2000 | ............ G02B/7/04 |

OTHER PUBLICATIONS

Kirschkamp, T., et al., "Construction of a model Eye to Simulate Purkinje Reflections for the Determination of the Radii of Curvature and of the Position of the Crystalline Lens of the Eye", *Biomed. Technik*, vol. 43, 1998, pp. 318–325.

Fatt, I., "Observations of Tear Film Break Up on Model Eyes", *Contact Lens Assn. Of Ophthalmologists Journal*, Oct. 1991, vol. 17, No. 4, pp. 267–281.

Liou, et al., "Anatomically accurate, finite model eye for optical modeling," *Journal of the Optical Society of America*, vol. 14, No. 8, Aug. 1997, pp. 1684–1695.

Smith, et al., "The optical modelling of the human lens," *Ophthal. Physiol. Opt.*, vol. 11, Oct. 1991, pp. 359–369.

Thibos, et al., "A New Optical Model of the Human Eye," *Optics & Photonics News*, Dec. 1993, p. 12.

Navarro, et al., "Accommodation–dependent model of the human eye with aspherics," *Journal of the Optical Society of America*, vol. 2, No. 8, Aug. 1985, pp. 1273–1281.

\* cited by examiner

*Primary Examiner*—Scott J. Sugarman
(74) *Attorney, Agent, or Firm*—William Greener

(57) ABSTRACT

An eye model system for remotely predicting the in-vivo performance of a vision altering optic includes a representative cornea, a dispersion medium, and a retinal surface. The corneal surfaces provide anatomical shape, optical power, and higher order aberration content. The dispersion medium mimics chromatic dispersion in an actual eye. The retinal surface is moveable to provide selected defocus. A humidity and temperature enclosure may be provided. Model eye elements can be tilted or decentered to simulate actual conditions. An associated method for remotely measuring the performance of a vision altering optic to predict its performance in-vivo includes making topography, wavefront, interferometry, PSF, MTF, or other optical and/or physical measurements of the model eye system with and without the optic in combination.

52 Claims, 2 Drawing Sheets

LENS-EYE MODEL AND METHOD FOR PREDICTING IN-VIVO LENS PERFORMANCE

BACKGROUND OF THE INVENTION

1. Field of the Invention

The present invention relates generally to methods and apparatus for measuring the performance of an optical lens, and more particularly to a model eye system for predicting the in-vivo performance of a vision altering optic, and methods related thereto.

2. Description of Related Art

Numerous descriptions of various eye models are found in the literature. Eye models are helpful for many reasons, including designing contact lenses, modeling vision under various conditions such as refractive surgical procedures, contact lens or spectacle wear, and near vision, for biometric applications, and many others.

It has long been a challenge in the field of vision correction to be able to predict the subjective response of a patient prior to actually altering the patient's vision, either surgically or by external means such as spectacles or contact lenses, for example. Moreover, soft contact lens performance in-vivo, for example, is difficult to predict due to changes in the lens' surface shapes caused by the actual, variable, corneal contours of people's eyes, as compared to the manufactured shape of the lens. Thus, the ability to accurately predict the in-vivo performance of a vision altering optic has many obvious advantages like reducing the time, cost, and uncertainty involved in efforts to improve people's vision. Accordingly, the recognition of the problems and advantages of predicting performance of a visual alteration has lead to the instant invention which is described in greater detail below.

SUMMARY OF THE INVENTION

The invention pertains to a model eye system useable in combination with a variety of vision altering optics such as contact lenses, IOLs, spectacle lenses, representative crystalline lenses, inlays, onlays, and others to remotely predict the in-vivo performance of the vision altering optic, and methods relating thereto. The term "remotely" herein refers to not being in-vivo, e.g., measuring a contact lens performance on a model eye to predict its performance when being worn on a real eye.

A model eye system according to an embodiment of the invention includes a structural housing; a representative cornea having an anterior surface and a posterior surface; a retinal surface located posterior to the posterior surface of the cornea; and a dispersion medium occupying the space between the cornea and the retinal surface (more specifically between the posterior corneal surface and the retinal surface). In an aspect of this embodiment, an enclosure provides a controlled environment around the anterior corneal surface and a vision altering optic under measurement if such an optic is present. The model eye system may have one or more clear apertures, variable apertures, and/or pupils positioned for light entry and exit or pupil function replication. The representative cornea is anatomically transparent. At least part of the anterior corneal surface has a shape to replicate anatomical function, while a specific shape imparted to the anterior corneal surface is preferably selected to alleviate and/or replicate lens fitting problems and more accurately predict in-vivo lens performance. At least part of the posterior surface of the representative cornea is also shaped; however, the posterior corneal shape preferably provides the model eye with optical power and with selected higher-order aberration content characteristic of an actual eye. A representative retinal surface forms the back surface of the eye model system and can be optically or physically transmissive, diffusely or specularly reflective, or customized as to material, construction and/or shape to have the desired characteristics for the investigation being conducted; for example, it or any other component of the model eye system may be tilted and/or decentered. A light source can thus be positioned in front of or behind the model eye system as desired. The space between the posterior corneal surface and the retinal surface is occupied by a dispersion medium that models the chromatic dispersion characteristics of an actual eye. The separation distance between the retinal surface and the posterior corneal surface is made variable via flexible model eye housing joints, for example, in order to provide a selected amount of defocus in the eye model.

According to another embodiment of the invention, a method for remotely measuring the performance of a vision altering optic to predict its performance in-vivo includes the steps of obtaining a value of a pre-selected metric of a model eye; appropriately locating the optic to be measured with respect to the model eye; and obtaining a value of the pre-selected metric for the optic and model eye combination. Various metrics for the model eye and the optic/model eye combination are envisioned by the invention and include, but are not limited to, topography measurements, wavefront measurements, modulation transfer function (MTF) measurements, point spread function (PSF) measurements, interferometry measurements, and physical and optical parameters and characteristics of the eye model and/or optic/eye model combination. Testing methods may include various modes and/or types of illumination, adjustment of eye model components to simulate anatomical conditions, and other adaptations appreciated by a person skilled in the art.

The explicit and implicit objects and advantages of the invention will now be described in more detail with reference to the drawing figures listed below, the detailed description of the preferred embodiments, and the appended claims.

DETAILED DESCRIPTION OF PREFERRED EMBODIMENTS OF THE INVENTION

Figure 1:
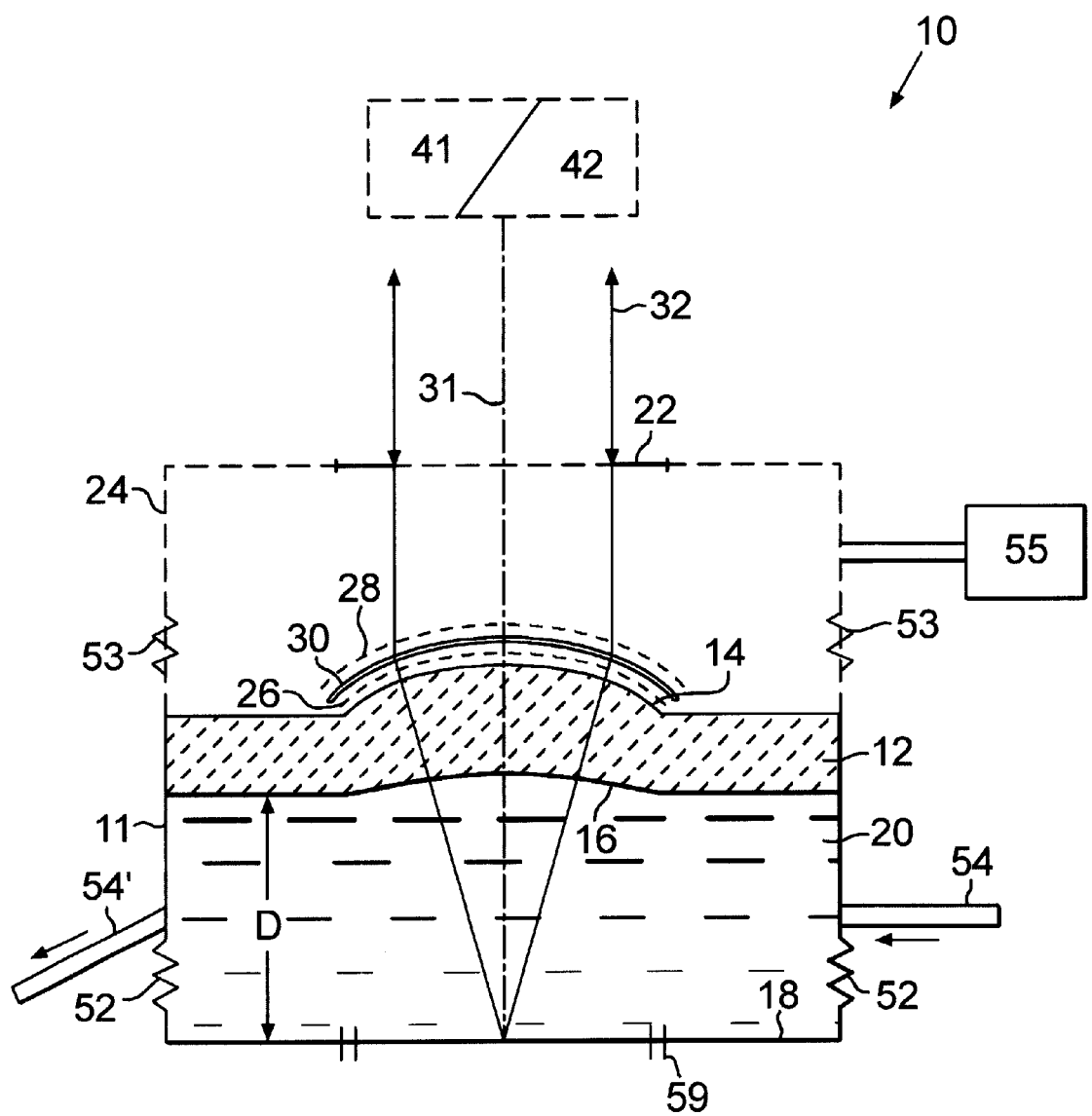
FIG. 1 is a schematic illustration of an exemplary model eye system according to an embodiment of the invention.

A schematic drawing of a model eye system 10 according to an embodiment of the invention is shown in FIG. 1. The model eye system 10 has a structural housing 11 and includes a representative cornea 12 having an anterior surface 14 and a posterior surface 16. A retinal surface 18 is located posterior to the posterior corneal surface 16 at a distance, D. A dispersion medium 20 is located between the posterior corneal surface 16 and the retinal surface 18. An optional enclosure 24 (shown in dotted lines) having a variable aperture 22 for light entry and exit, surrounds the anterior corneal surface 14 to provide a controlled environment as necessary or desired for the measurement being conducted. As illustrated, a soft contact lens 30 is located on the anterior corneal surface 14.

The housing 11, in the region of the dispersion medium 20, is shown having flexible joints 52 that allow the separation distance D between the cornea 12 and the retinal surface 18 to be adjusted for focus error, and for providing a tilting and/or decentering function as more fully described below. Similar flexible joints 53 may also be provided for the enclosure 24.

The representative cornea 12 is constructed from an optically and anatomically transparent, machineable material such as polymethylmethacrylate (PMMA). Alternatively, similarly characteristic materials may be used, such as glass, polycarbonate, polystyrene, styrene acrylonitrile (SAN), topaz, cyclo-olefin polymers, CR-39, amorphous polyolefin, and others preferably having dispersion characteristics similar to those of an actual eye. The use of advantageous materials provide corneal rigidity, while surface shape can easily be imparted to the material by various known techniques. For example, the anterior corneal surface 14 can be machined by a diamond turning process well known to those skilled in the art to impart a surface shape representative of an actual cornea. Alternatively, based upon corneal curvature and shape data characteristic of the general population, a standard or typical surface shape can be imparted to the anterior corneal surface 14. It will be appreciated that other techniques may be used to create a desired shape for the anterior corneal surface. For example, spherical, aspheric, toric, or custom shapes can be imparted by techniques including laser ablating the surface, cast molding the surface, thermally molding the surface, grinding and polishing, and by other known techniques.

The posterior corneal surface 16 is likewise shaped to preferably provide an optical power for the model eye system representative of actual corneal power. In addition, the posterior corneal surface shape can be made to produce higher-order monochromatic optical aberrations of an actual eye. Appropriate surface shape data can be obtained from wavefront sensor measurements of an actual eye or may be generated by mathematical equations indicative of wavefront aberrated surfaces, for example, Zernike polynomial equations.

A selected amount of focus error can also be provided in the eye model system by selecting the appropriate separation distance, D, between the posterior corneal surface 16 and the retinal surface 18. To this end, the model eye system 10 can preferably be lengthened or shortened. Reference numeral 52 represents a flexible expansion/contraction joint to facilitate this. A person skilled in the art will appreciate that there are various constructions to vary the separation distance, D. For example, the relevant portion of the model eye system may comprise an expandable bladder in the region of the dispersion medium 20. Such a construction would serve to enclose a liquid dispersion media and provide the defocus adjustment by allowing the retinal surface 18 to be moveable with respect to the posterior corneal surface 16. The representative cornea 12 can also be tilted and/or decentered to replicate anatomical conditions. This can be accomplished, for example, by the flexible joints 52 as shown.

Figure 2:
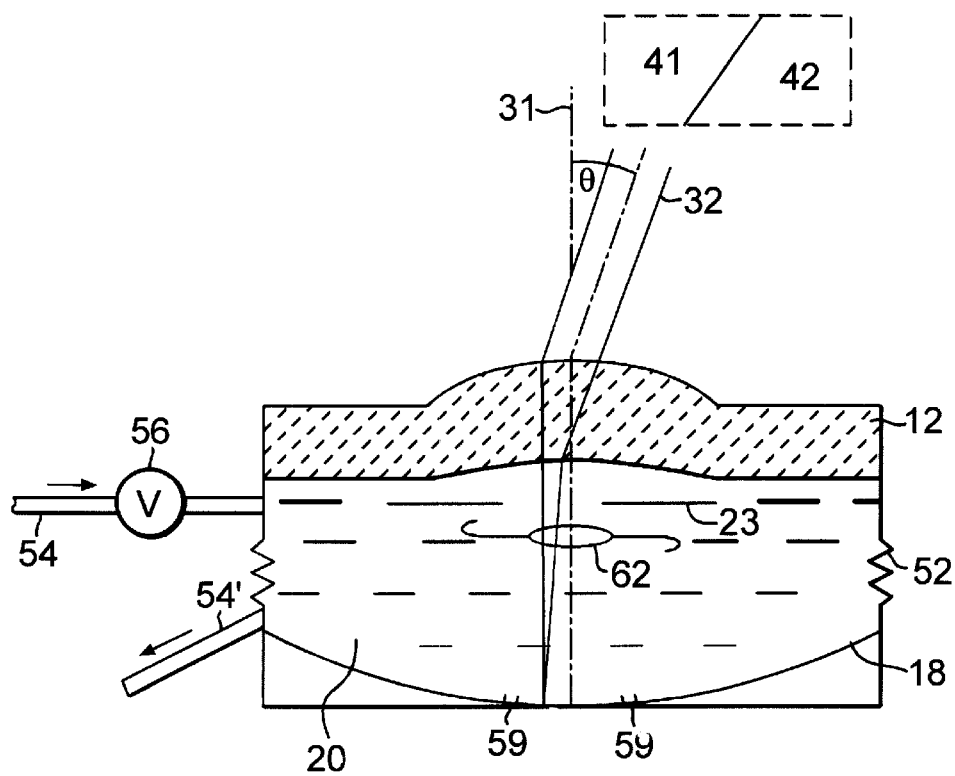
FIG. 2 is a schematic illustration of an exemplary model eye system according to an aspect of the invention.
Figure 3:
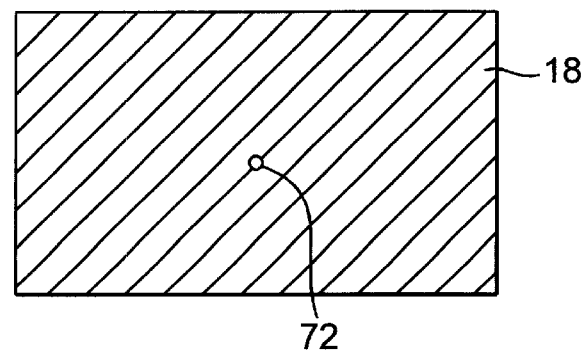
FIG. 3 is a top plan view of an exemplary retinal surface of a model eye system according to an embodiment of the invention.

The retinal surface 18 is a surface upon which an image (e.g., a focal spot) can be formed and optically transmitted or reflected, depending upon where a light source 41 and a particular measuring device 42 are located. The retinal surface can be a diffuse scattering surface, a specularly reflecting surface, a surface with a light transmitting aperture 72 as shown in FIG. 3, or it may have particular polarizing or filtering characteristics to replicate cone function or other selective features. As shown in FIG. 1, the retinal surface 18 is planar. An anatomically correct retinal surface would have a concave radius of curvature of about −11 mm. In an aspect of the invention, the retinal surface 18 can be shaped as shown in FIG. 2. Moreover, in the case of a non-planar retinal surface 18 in FIG. 2, the surface can be tilted, decentered, or otherwise displaced to replicate actual eye characteristics. It will be convenient under such construction for the retinal surface 18 to include alignment indicia 59. The representative retina may be constructed from the same materials and techniques as for the representative cornea.

A dispersion medium 20 of the model eye system 10 is shown in FIG. 1. The volume of space enclosed by the model eye system housing 11, the posterior corneal surface 16 and the retinal surface 18 is occupied by a liquid such as, e.g., water or saline, or any optically transparent liquid or gel media that preferably is representative of the chromatic dispersion characteristics of an actual eye. An inlet 54 is provided, along with a drain 54', for adding and removing material. In an aspect of the invention, the dispersion medium is pressurized. This is advantageous when the optic under test is an IOL, for example.

An optional enclosure 24 surrounds the anterior corneal surface 14 and preferably provides the eye model system with a controlled temperature and humidity environment through temperature/humidity controller 55. This is advantageous, for instance, when the optic under test is a soft contact lens 30 The environment in which the contact lens 30 resides is maintained to minimize the evaporation of tear layers 26, 28 and the dehydration of the contact lens 30. For example, since 66% of the volume of a hydrated Soflens 66® (Bausch & Lomb, Rochester, N.Y.) soft contact lens contains water, the humidity inside the enclosure 24 is maintained at at least 66%, so that the contact lens 30 will be stable and not dry out. In addition, the rate of evaporation of the tears 26, 28 will be significantly reduced. The humidity may range between 0–100%, and the temperature may be in a range to simulate actual environmental conditions.

FIG. 1 shows light 32 entering the model eye system 10 generally parallel to a central axis 31 of the model eye system. A light source 41 is positioned in front of the corneal enclosure 24. The light passes through a variable aperture 22 located adjacent the enclosure 24 surface. A tear film 26 coats the anterior corneal surface 14. The tear film 26 is created, for example, by dropping water, saline or "natural"

tears over the anterior corneal surface. A soft or RGP contact lens 30 can be placed on the surface and lightly pressed on to the corneal surface 14. The air between the two surfaces is forced out and a volume of negative pressure is then formed. The negative pressure holds the contact lens 30 in place. An anterior tear film 28 can then be created by dropping additional tear media onto the exposed contact lens surface. In the case of a soft contact lens 30 being tested, the temperature and/or humidity in the enclosure 24 is controlled by controller 55. The light is focused by the lens 30 and cornea 12 onto the retinal surface 18 after passing through the dispersion medium 20. The light is then diffusely reflected back through the system and into a diagnostic device 42 such as a wavefront sensor.

In an alternative aspect of this embodiment, light 32 from light source 41 may enter the model eye system at an angle θ with respect to axis 31 to impinge the representative cornea 12 at an angle, as shown in FIG. 2. In this aspect of the invention, the light passes through the cornea 12 and through a pupil 23 and IOL 62 which are located in a pressurized dispersion medium 20. Pressurization is provided by a pressurizing valve system 56 associated with inlet 54 and outlet 54'. The light is focused on a curved retinal surface 18 as shown. The retinal surface 18 is decentered with respect to axis 31. Alignment indicia 59 are provided to locate the light spot and for alignment purposes.

It will be appreciated that the retinal surface 18 may be constructed to scatter or reflect the light 32 back through the model eye system into a diagnostic measurement device 42, or, to transmit the light through the retinal surface if it is made transparent. Alternatively, illustrated with reference to FIG. 3, the retinal surface 18 is shown having a pinhole aperture 72. The model eye system can conveniently be back-illuminated through the pinhole aperture 72 with the light emerging from the top of the eye model system.

Although not shown, the optic under test may be a spectacle lens located posterior to the cornea 12, a representative crystalline lens located adjacent pupil 23 in FIG. 2, or other vision altering optics singularly or in combination and appropriately positioned with respect to the model eye system. In an exemplary embodiment wherein the optic under test is a representative crystalline lens, the lens would preferably be bi-convex with aspheric surfaces. This lens could be made of the same materials as the cornea and may also have a gradient-index to mimic an actual crystalline lens. In addition, the lens may be made of a flexible material, such as a hydrogel or a silicone (which could also have gradient-index properties), and could be secured in a fixture that could squeeze and stretch the lens to mimic actual accommodation. Portions of the lens may be made opaque or semi-opaque with paint or colorant in order to represent a cataract condition. Accordingly, both phakic (with crystalline lens in place) and aphakic (with crystalline lens removed) IOL lenses could be evaluated. The phakic IOL is placed between the cornea and the pupil, which is anterior with respect to the crystalline lens.

In another embodiment of the invention, a method is described for remotely measuring the performance of a vision altering optic, e.g., a soft or rigid gas-permeable contact lens 30, when placed on a corneal surface 14 of the model eye in order to predict its performance when placed on an actual eye. Accordingly, a method for remotely measuring a lens to predict its performance in-vivo includes the steps of obtaining a value of a pre-selected metric of a model eye, locating the lens to be measured on a representative corneal surface or other suitable position in the model eye, and obtaining a value of the pre-selected metric for the lens and model eye combination such that the obtained lens/eye metric is a predictor of the performance of the lens in-vivo.

As applicable to the measurement of a contact lens, for illustration purposes, the step of obtaining the value of the pre-selected metric of the model eye preferably includes one of the following: a topography measurement, a wavefront measurement, an MTF measurement, a PSF measurement, an interferometry measurement, or a physical or optical parameter measurement of the model eye. A topography measurement, for example, can be obtained from a topography device such as an Orbscan II™ (Bausch & Lomb/Orbtek) topographic analyzer. Likewise, a wavefront measurement can be obtained through the use of a wavefront sensor such as e.g., a Zywave™ (Bausch & Lomb/Technolas) wavefront measurement device. Alternatively, the performance of the model eye and the lens/model eye combination can be measured by the MTF or PSF of the system. For example, to measure the PSF, a pinhole of known size is located at a large distance in front of the model eye, or in the retinal plane as described with reference to FIG. 3. The pinhole is back illuminated with monochromatic or polychromatic light. The model eye images the pinhole on to the retinal surface 18 or other appropriate surface. A microscope with a CCD camera is placed behind the surface and captures the image of the pinhole. A computer is used to analyze the image and calculate the PSF of the model eye. A contact lens can then be placed onto the anterior corneal surface of the eye model and the resulting PSF can be measured. Similarly, the MTF of the lens/model eye system can be measured by using multiple pinholes with different known diameters or with a variable grating, as one skilled in the art will understand. These measurements then allow for the prediction of the performance of the subject contact lens when it is placed on the eye of a wearer. Measurement devices are illustrated in the Figures by dotted lines, but do not constitute a part of the invention per se.

The exemplary wavefront measurement referred to above can be performed by making the retinal surface a diffuse scattering surface. A collimated beam of light is sent into the model eye and is focused to a diffraction-limited spot on the diffuse reflecting surface. The diameter of the entering beam is stopped down by a variable aperture or pupil sufficiently to achieve diffraction limited beam quality. The light is reflected back through the model eye and exits collimated. An optical system is constructed such that the entrance pupil of the model eye is imaged on to an array of lenses typical of a Hartmann-Shack type wavefront sensor. A CCD camera captures the images produced by the array of lenses. A computer analyzes the locations of the images and calculates the wavefront error function. This also allows one to then predict the performance of the contact lens on an actual eye.

It will be appreciated that while the foregoing is a full and complete description of the preferred embodiments of the invention, various modifications, alternate constructions and equivalents will occur to those skilled in the art. Thus, the foregoing description should not be construed as limiting the invention, which is defined by the appended claims.

I claim:

1. A model eye system, comprising:
   a housing including a flexible joint located intermediate a posterior cornea surface and a retinal surface;
   a representative cornea having an anterior surface and a posterior surface, located in the housing;
   a retinal surface located in the housing posterior to and separated from the posterior surface of the cornea; and
   a dispersion medium intermediate the representative cornea and the retinal surface, wherein the dispersion medium comprises at least one of water, saline, and an optically transparent liquid or gel media having a desired chromatic dispersion characteristic.

2. The system of claim 1, further comprising an enclosure having a clear aperture, at least partially surrounding the anterior corneal surface.

3. The system of claim 1, wherein the representative cornea is an optically transparent material.

4. The system of claim 3, wherein the representative cornea is selected from a group consisting of PMMA, glass, polycarbonate, polystyrene, SAN, topaz, cyclo-olefin polymers, CR-39 and amorphous polyolefin.

5. The system of claim 1, wherein at least apart of the anterior surface of the cornea has a shape representative of at least one of a patient's actual corneal shape and a standard shape.

6. The system of claim 1, wherein at least a part of the posterior surface of the cornea has a shape representative of at least one of an optical power of an eye and a higher order optical aberration of an eye.

7. The system of claim 2, wherein the clear aperture is a variable aperture.

8. The system of claim 1, further comprising another aperture suitably located in the housing.

9. The system of claim 8, wherein the other aperture is a variable aperture.

10. The system of claim 1, wherein the retinal surface is variably separated from the posterior surface of the cornea.

11. The system of claim 10, wherein the variable separation between the retinal surface and the posterior corneal surface provided a selected amount of defocus.

12. The system of claim 1, wherein the housing comprises an expansion/contraction portion.

13. The system of claim 12, wherein the expansion/contraction portion includes a flexible bladder.

14. The system of claim 1, wherein the dispersion medium is pressure controlled.

15. The system of claim 1, wherein the dispersion medium is temperature controlled.

16. The system of claim 1, wherein the retinal surface includes alignment indicia.

17. The system of claim 1, wherein the retinal surface comprises a band-pass filter.

18. The system of claim 1, wherein the retinal surface has an aperture.

19. The system of claim 2, further comprising at least one of a temperature and humidity controller connected to the enclosure.

20. The system of claim 2, wherein the enclosure provides at least one of a humidity and temperature environment.

21. The system of claim 1, further comprising a tear film adjacent the anterior corneal surface.

22. The system of claim 21, further comprising a contact lens adjacent the tear film.

23. The system of claim 22, further comprising another tear film adjacent an anterior surface of the contact lens.

24. The system of claim 22, wherein the contact lens is one of decentered and tilted.

25. The system of claim 1, further comprising an IOL located intermediate the posterior corneal surface and the retinal surface.

26. The system of claim 25, wherein the IOL is one of decentered and tilted.

27. The system of claim 1, further comprising a spectacle lens located anterior to the anterior surface of the cornea.

28. The system of claim 27, wherein the spectacle lens is one of decentered and tilted.

29. The system of claim 1, further comprising a representative crystalline lens located between the posterior surface of the cornea and the retinal surface.

30. The system of claim 29, wherein the crystalline lens is bi-convex and has an aspheric surface.

31. The system of claim 29, wherein the crystalline lens has a gradient index of refraction.

32. The system of claim 29, wherein the crystalline lens has a suitably flexible structure to simulate accommodation in an actual eye.

33. The system of claim 29, wherein at least a portion of the crystalline lens has a degree of opacity to simulate a cataract condition of an actual eye.

34. The system of claim 29, further comprising an IOL located between the cornea and a pupil which itself is located anterior to the crystalline lens.

35. The system of claim 1, wherein the retinal surface is planar.

36. The system of claim 1, wherein the retinal surface has a non-planar shape.

37. The system of claim 1, wherein the retinal surface is at least one of decentered and tilted with respect to an axis of the model eye system.

38. The system of claim 1, wherein the cornea is at least one tilted and decentered with respect to the retinal surface.

39. The system of claim 1, wherein the anterior corneal surface is at least one tilted and decentered with respect to the posterior corneal surface.

40. The system of claim 1, further comprising a light source located at least one of anterior to the cornea and posterior to the retinal surface.

41. A method for remotely measuring a vision altering optic to predict its performance in-vivo, comprising:
    obtaining a value of a pre-selected metric of a model eye;
    suitably locating the optic to be measured with respect to the model eye;
    obtaining a value of the pre-selected metric for the optic and model eye combination,
    whereby the obtained optic/model eye metric is a predictor of the performance of the optic in-vivo.

42. The method of claim 41, wherein the optic is at least one of a contact lens, an IOL, a spectacle lens, a representative crystalline lens, an inlay and an onlay.

43. The method of claim 41, wherein obtaining a value of a pre-selected metric of a model eye includes at least one of a topography measurement, a wavefront measurement, an interferometry measurement, an MTF measurement, a PSF measurement, a physical parameter of the model eye measurement, and an optical parameter of the model eye measurement.

44. The method of claim 41, wherein obtaining a value of the pre-selected metric for the optic and model eye combination includes at least one of a topography measurement, a wavefront measurement, an interferometry measurement, an MTF measurement, a PSF measurement, a physical parameter of the lens/model eye combination measurement, and an optical parameter of the lens/model eye combination measurement.

45. The method of claim 41, wherein obtaining a value of a pre-selected metric of a model eye further comprises setting a variable separation distance between a posterior corneal surface and a representative retinal surface of the model eye.

46. The method of claim 41, wherein obtaining a value of the pre-selected metric for the optic and model eye combination comprises subjecting at least an anterior corneal surface to one of a controlled humidity and temperature environment.

47. The method of claim 41, further comprising propagating light through a variable aperture to control a size of the light in the model eye.

48. The method of claim 41, wherein the method further comprises imparting a shape on a representative corneal surface of the model eye.

49. The method of claim 41, wherein the method further comprises imparting at least one of an optical power and an aberration content on a representative corneal surface of the model eye.

50. The method of claim 49, wherein the optical power and/or aberration content is imparted on a posterior surface of the representative cornea.

51. The method of claim 41, comprising at least one of diamond machining, laser ablating, cast molding, grinding/polishing, and thermally molding at least one of a representative corneal surface, a representative retinal surface, and the optic under test.

52. The method of claim 41, wherein obtaining a value of a pre-selected metric of a model eye includes at least one of tilting and decentering at least one of a representative corneal surface and retinal surface.

* * * * *